May 19, 1936.  O. W. GITHENS  2,040,935
PHOTOGRAPHIC CAMERA
Original Filed Aug. 4, 1933
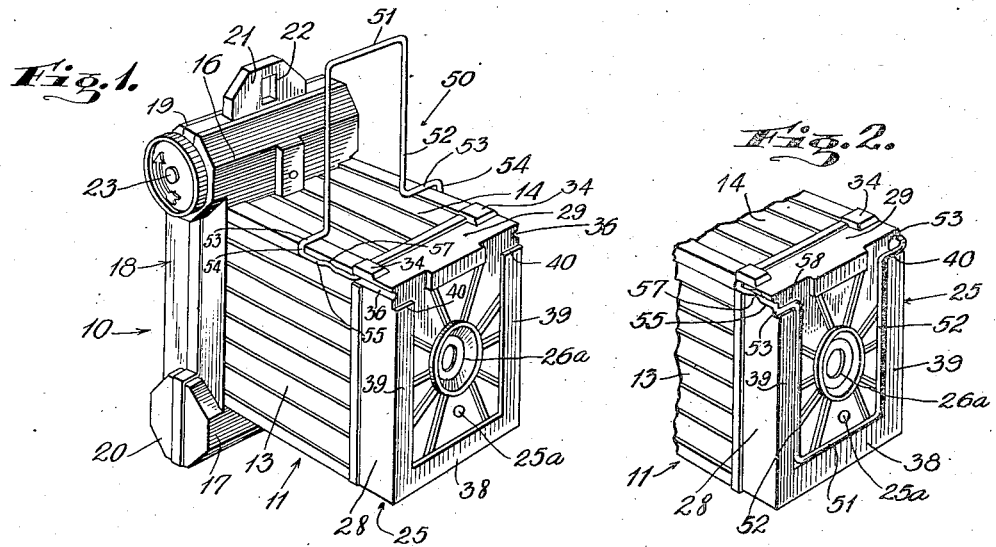
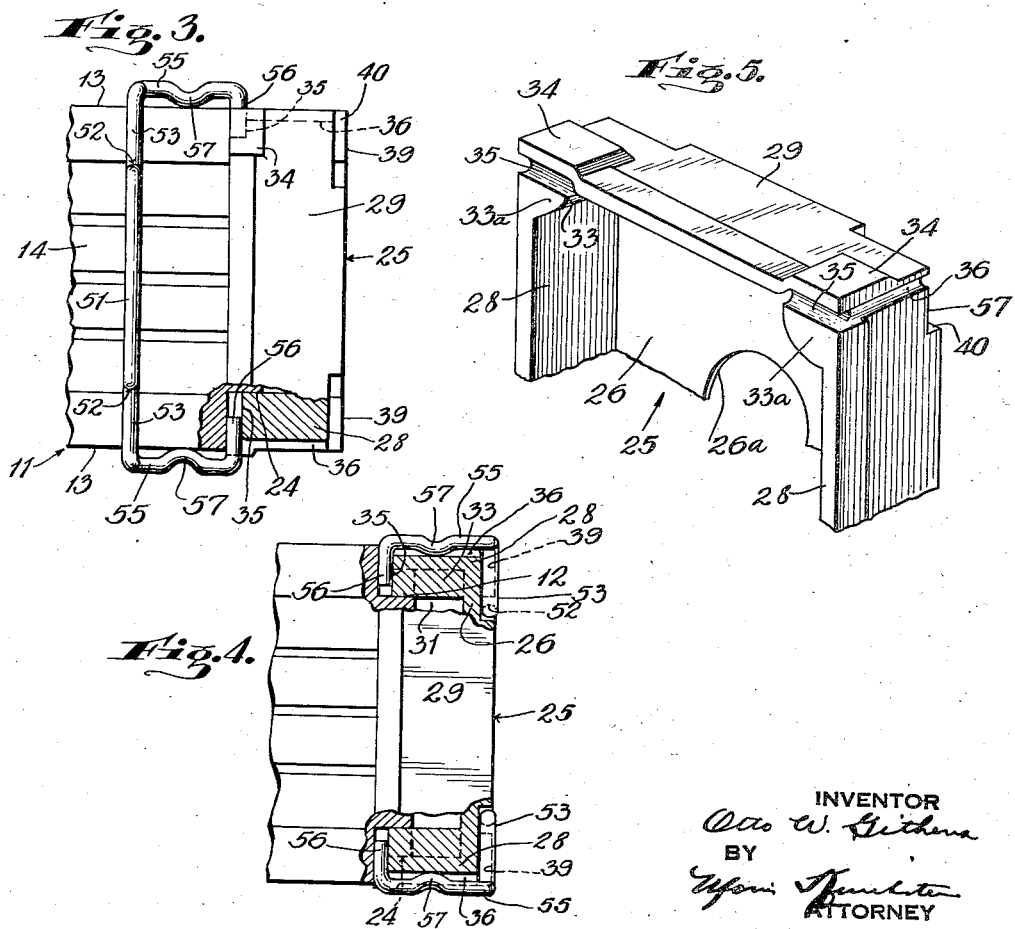
INVENTOR
Otto W. Githens
BY
ATTORNEY Patented May 19, 1936

2,040,935

UNITED STATES PATENT OFFICE 2,040,935

PHOTOGRAPHIC CAMERA

Otto W. Githens, New York, N. Y., assignor to Universal Camera Corp., New York, N. Y., a corporation of New York Original application August 4, 1933, Serial No. 683,595, now Patent No. 2,029,475. Divided and this application March 10, 1934, Serial No. 714,910

17 Claims. (Cl. 33—64)

This invention relates to photographic cameras.

An object of this invention is to provide a camera of the character described provided with a sight opening and having an improved finder movable to operative position to cooperate with the sight opening, and being also movable to inoperative position, in which position the finder is adapted to lie entirely against surfaces of the camera casing whereby said finder will not project from the camera casing in the latter position.

A further object of this invention is to provide a neat, compact and rugged camera of the character described, which shall comprise comparatively few and simple parts, be relatively inexpensive to manufacture, easy to assemble and operate, and withal practical and efficient to a high degree.

This application is a division of my co-pending application, Serial No. 683,595, filed August 4, 1933.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a front perspective view of the camera embodying the invention, with the finder in operative position;

Fig. 2 is a perspective view of the front portion of the camera shown in Fig. 1 and showing the finder in inoperative position;

Fig. 3 is a partial, top plan view of the front cover of the camera with the finder in operative position and parts broken away to show the interior construction;

Fig. 4 is a view similar to Fig. 3 but showing the finder in inoperative position; and Fig. 5 is a partial, perspective, interior view of the front cover of the camera.

Referring now in detail to the drawing, 10 designates a camera embodying the invention, having a prismatic portion 11 formed with a front wall 12 having a shutter opening, side walls 13, and top and bottom walls 14. Extending from the prismatic portion 11 are upper and lower integral portions 16 and 17 each forming half of a film spool receiving chamber; and fitted over the rear of the camera is a cover member 18 having portions 19 and 20 at the top and bottom thereof cooperating with the extensions 16 and 17 to complete the film spool receiving chambers.

Extending upwardly from the upper end of the cover 18 is an integral, vertical wall 21 parallel to the front wall of the camera, formed with a preferably rectangular sight opening 22. Housed within the film spool receiving chambers are the film spools shown and described in my said co-pending application, the spool in one of the chambers being operated by a knob 23.

The front wall 12 is formed with a grooved shoulder 24 at the top, bottom and sides thereof, receiving a front cover 25 fixed thereto by rivet 25a. The cover 25 is formed with a front wall 26 parallel to the wall 12 and spaced therefrom and having an opening 26a aligned with the shutter opening in the front wall 12. Said cover is also formed with a bottom wall, side walls 28 and a top wall 29 the edges whereof are slidably received on said shoulder 24. Between the front wall 12 and the front wall 26 of the front cover 25 is formed a chamber 31 for receiving the shutter mechanism, shown and described in my said co-pending application.

The junction between the side walls 28 and the top wall 29 of the front cover 25 is preferably thickened, as at 33, and the top wall 29 is provided with raised portions 34 above said thickened portions 33. The inner surfaces 33a of the portions 33 are formed with horizontal aligned grooves 35. The outer surfaces of the side walls 28 are formed with parallel, horizontal grooves 36 communicating with said grooves 35. The front surfaces of the front wall 26 are provided with a horizontal raised portion 38 at the bottom thereof and with vertical, raised portions 39 at the sides thereof extending from the portion 38 and terminating short of the upper surface of the top wall 29, as at 40, forming aligned, horizontal shoulders.

Swivelled on the camera casing is a finder 50 for cooperating with the sight opening 22. The finder 50 may be made of a single piece of bent and shaped wire or strip, and comprises a top horizontal portion 51 from the ends of which extend downwardly, parallel vertical portions 52. Extending from the bottom ends of the vertical portions 52 are outwardly extending, aligned, horizontal portions 53 contacting the top wall 14. Extending downwardly from the ends of the portions 53 are short, parallel portions 54 substantially contacting the side walls 13. From the lower ends of portion 53 extend forwardly parallel horizontal portions 55, having inwardly extending, aligned, horizontal end portions 56 received within the grooves 35. The portions 55 may be formed with inwardly curved or humped portions 57 resiliently pressing against the side walls 13.

In Fig. 1 the finder is shown in operative position. In using the camera, the portions 52 and 51 of the finder cooperate with the sight opening 22 to frame the object to be photographed. The length of the portions 55 is substantially equal to the width of the side walls 28. The finder is swivelled or hinged about the end portions 56 thereof and may be moved to the position shown in Fig. 2 of the drawing. In such position the portions 55 snap into the grooves 36. The portions 52 contact the front surface of the front wall 26 and lie above the shoulders 40. The portions 52 lie against the inner edges of shoulders formed by the raised portions 39 and the portion 51 lies above the shoulder formed by the portion 38. The portions 53 lie adjacent the edges 58 formed by the side walls 28 and the front wall 26 above the shoulders 40. Normally the finder is in inoperative position and lies adjacent the surfaces of the casing so as not to project therefrom, thus facilitating shipping, packaging and carrying of the camera. As illustrated in Fig. 2, the humped portions 57 of the finder snap into the grooves 36 and retain the finder in said inoperative position.

It will thus be seen that there is provided a device in which the several objects of this invention are achieved, and which is well adapted to meet the conditions of practical use.

As various possible illustrative embodiments might be made of the above invention, and as various changes might be made in the embodiment above set forth, it is to be understood that all matter herein set forth, or shown in the accompanying drawing, is to be interpreted as illustrative and not in a limiting sense.

Having thus described my invention, I claim as new and desire to secure by Letters Patent:

1. A camera comprising a casing having a sight opening, a front cover attached to the front end of the casing, and a finder swivelled to the casing about a portion thereof received between said cover and the casing.

2. A camera casing having a prismatic portion, and a finder having a pair of parallel vertical portions interconnected at the top by a horizontal portion, aligned portions extending outwardly from said parallel portions and contacting the top of the camera casing, parallel portions extending downwardly from the outer ends of said aligned portions and substantially contacting the sides of said camera casing, portions extending forwardly from the bottom ends of said downwardly extending portions and contacting the sides of said camera casing, and aligned portions extending inwardly from the forward ends of said forwardly extending portions and contacting the front wall of said camera casing, and a cover for said front wall of the casing attached thereto and contacting said inwardly extending portions.

3. In a camera, a casing having a front wall, a cover for said front wall attached thereto, a finder swivelled about a portion thereof received between the inner surfaces of said front wall and cover, and one of said surfaces being formed with a groove for receiving said portion of said finder.

4. In a camera, a casing having a front wall, a cover attached to said front wall, said casing being open at the rear, a back member attached to the rear of said casing and formed with a projection provided with a sight opening, and a finder cooperating with said sight pivotally mounted on said casing, said finder having portions received between said cover and front wall and including a pair of parallel, vertical portions interconnected at the top by a horizontal portion, said parallel portions and horizontal portion being rotatable to a position against the front surface of said cover.

5. A camera comprising a casing, and a finder having a pair of parallel vertical portions interconnected at the top by a horizontal portion, aligned portions extending outwardly from said parallel portions and contacting the top of the camera casing, parallel portions extending downwardly from the outer ends of said aligned portions and contacting the sides of said camera casing, portions extending forwardly from the bottom ends of said downwardly extending portions and substantially contacting the sides of said camera casing, and aligned portions extending inwardly from the forward ends of said forwardly extending portions, said finder being swivelled to the camera casing about said inwardly extending portions.

6. A camera comprising a casing, and a finder having a pair of parallel vertical portions interconnected at the top by a horizontal portion, aligned portions extending outwardly from said parallel portions and contacting the top of the camera casing, parallel portions extending downwardly from the outer ends of said aligned portions and substantially contacting the sides of said camera casing, portions extending forwardly from the bottom ends of said downwardly extending portions and contacting the sides of said camera casing, and aligned portions extending inwardly from the forward ends of said forwardly extending portions, said finder being swivelled to the camera casing about said inwardly extending portions, said finder being movable to a position for bringing said parallel vertical portions, said horizontal interconnecting portion, said aligned outwardly extending portions and said downwardly extending portions against the front of the camera casing.

7. In a camera, a casing having a front wall, a cover for said front wall attached thereto, a finder swivelled to said casing about aligned axle portions received between said cover and the front wall of the casing, and the inner surface of the cover being formed with grooves for rotatably receiving said axle portions of the finder.

8. A camera comprising a casing formed with a prismatic portion open at the rear, a rear cover for the rear of said camera, film spool chambers formed at the top and bottom of said camera, a sight on the top of the upper chamber, and a finder pivoted to said camera and adapted to cooperate with said sight.

9. A camera comprising a casing having a sight opening, a front cover attached to the front end of the casing, a finder pivoted to the casing about axle portions received between said cover and casing, said finder having a portion adapted to cooperate with said sight opening for framing the object to be photographed, said portion being disposed in a plane rearwardly of said axles when the finder is in operative position, said finder being pivotable about said axles to inoperative position to bring said portion against the front face of said cover, said portion being disposed in a plane parallel to the first plane and forwardly of said axles in the latter position thereof.

10. A camera comprising a casing having a sight opening, a finder having a portion adapted to cooperate with said sight opening to frame the object to be photographed, and means for swivelling said finder on said casing about an axis parallel to and disposed forwardly of said portion when said finder is in operative position.

11. A camera comprising a casing having a sight opening, a finder having a portion adapted to cooperate with said sight opening to frame the object to be photographed, means for pivoting said finder on said casing about an axis parallel to and disposed forwardly of said portion when said finder is in operative position, said finder being pivotable about the axis thereof to inoperative position to bring said portion against the front end of the camera, said portion being disposed forwardly of said axis in the latter position thereof.

12. A camera casing having a light chamber portion and a finder adapted, in operative position, to frame the object to be photographed, and having a pair of parallel upstanding portions interconnected at the top by a horizontal portion, portions extending outwardly from said parallel portions and adapted to contact the top of the light chamber portion, portions extending forwardly from said outwardly extending portions, and aligned axle portions extending inwardly from the forward ends of said forwardly extending portions pivoted to said casing.

13. A camera casing having a light chamber portion and a finder adapted, in operative position, to frame the object to be photographed, and having a pair of parallel upstanding portions interconnected at the top by a horizontal portion, aligned portions extending outwardly from said parallel portions and adapted to contact the top of the light chamber portion, parallel portions extending downwardly from the outer ends of said aligned portions, portions extending forwardly from the bottom ends of said downwardly extending portions and aligned axle portions extending inwardly from the forward ends of said forwardly extending portions, a cover attached to the front wall of said light chamber portion and contacting said axle portions, said finder being pivotable about said axle portions to inoperative position to bring the parallel vertical portions and the top horizontal portion against the front face of the cover, said cover being formed with a pair of grooves for receiving the forwardly extending portions, in the latter position of the finder.

14. A camera comprising a casing having a front wall and a second wall at an angle thereto, a field viewing sight at the rear end of the casing and a finder pivotally mounted on said casing so as to be capable of being swung down to an ineffective position lying substantially against said front wall and swung upwardly therefrom to an effective position projecting at an angle from said second wall, said finder having a portion adapted in the effective position of said finder to contact said second wall.

15. A camera comprising a casing, and a field viewing sight pivotally mounted on said casing, said sight being formed of a piece of wire looped into a generally U-shaped outline with its ends turned inwardly to form pivots for the sight and with offsets near its ends for contact with a portion of said casing to limit pivotal movement of said sight in one direction.

16. A camera comprising a casing having a body part and a front part secured to and abutting against said body part, a pair of recesses formed in one of said parts substantially at its junction with the other of said parts, and a field viewing sight formed of a piece of wire looped into a generally U-shaped part with the ends of the wire offset from the plane of said U-shaped part and extending into said recesses and rotatable therein to form a pivotal connection between said casing and said sight.

17. Construction according to claim 16 in which said sight is so shaped and mounted that said U-shaped part thereof may be swung down to a position lying substantially against the front surface of said front casing part and may be swung up therefrom through substantially 180° to an effective upstanding position with said U-shaped part projecting from said body part and lying substantially in a plane parallel to and rearwardly of said front surface of said front casing part.

OTTO W. GITHENS.